Figure 1:
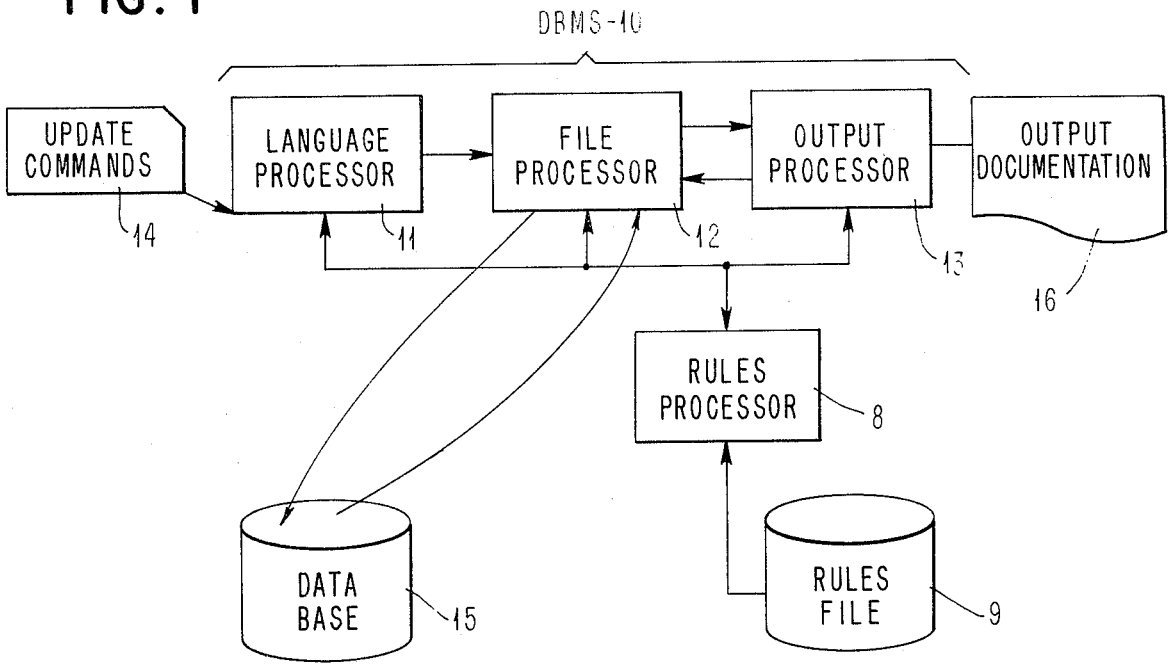
Figure 2:
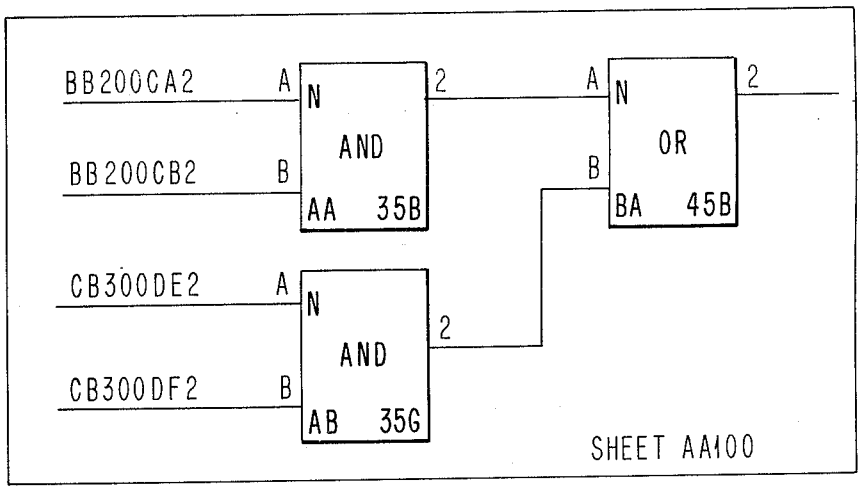
Figure 3:
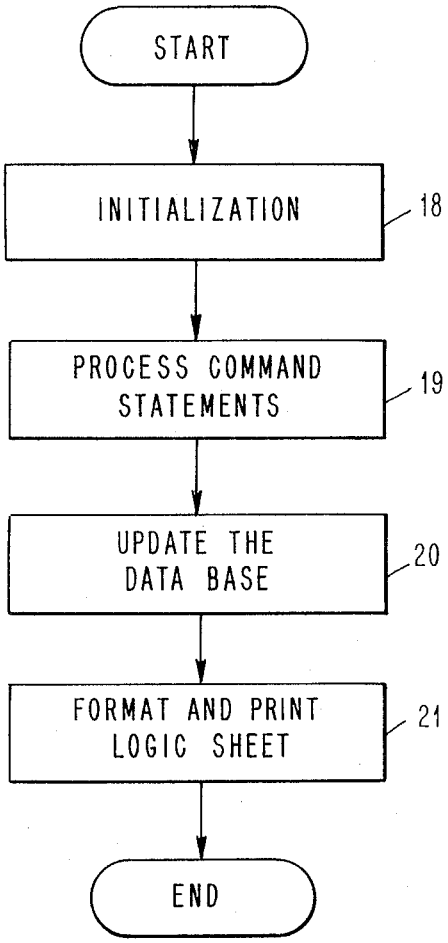
Figure 4:
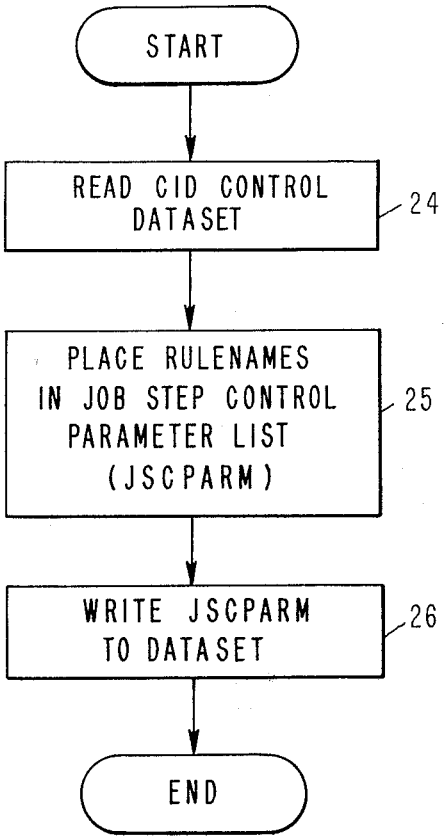
Figure 5A:
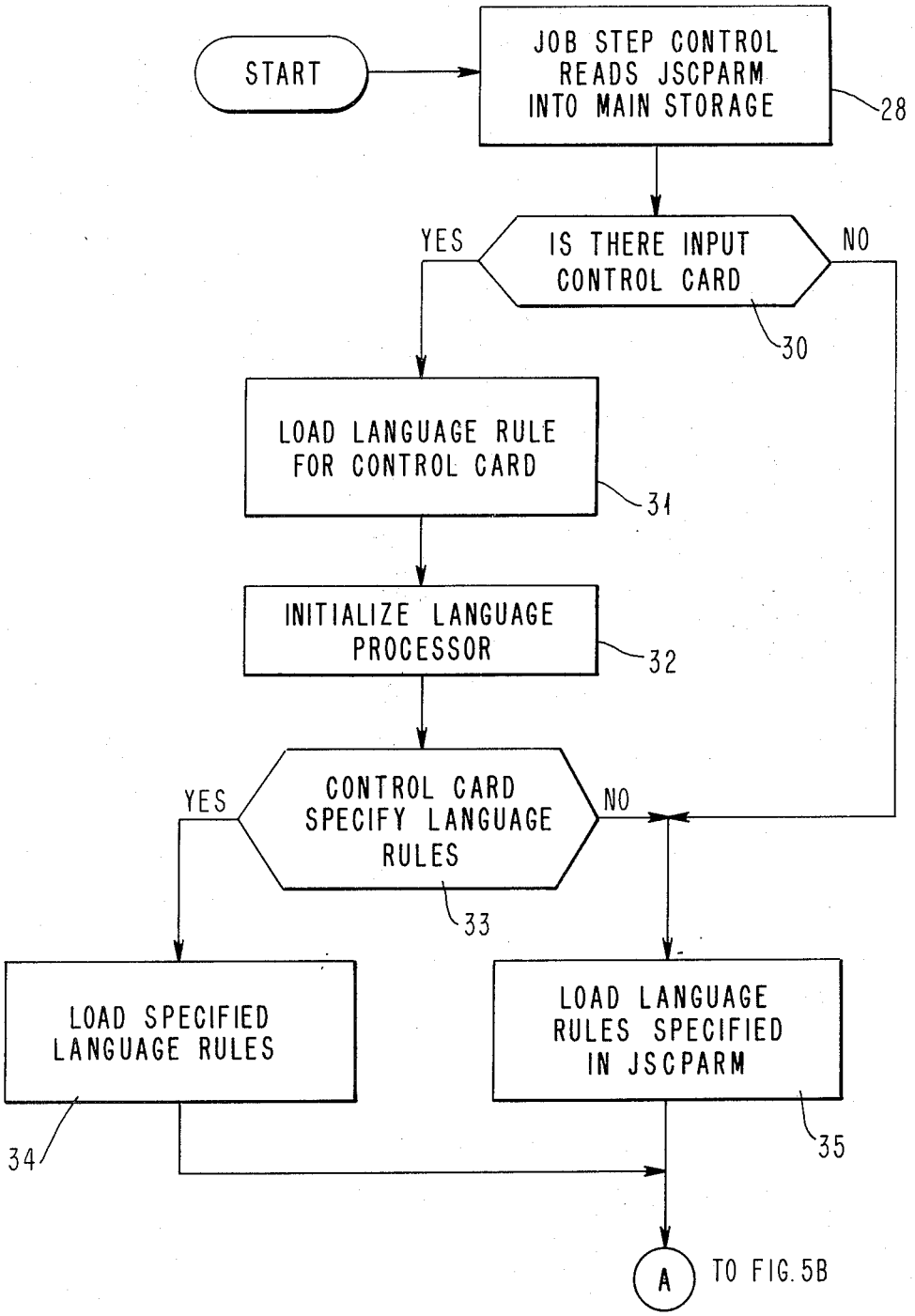
Figure 5B:
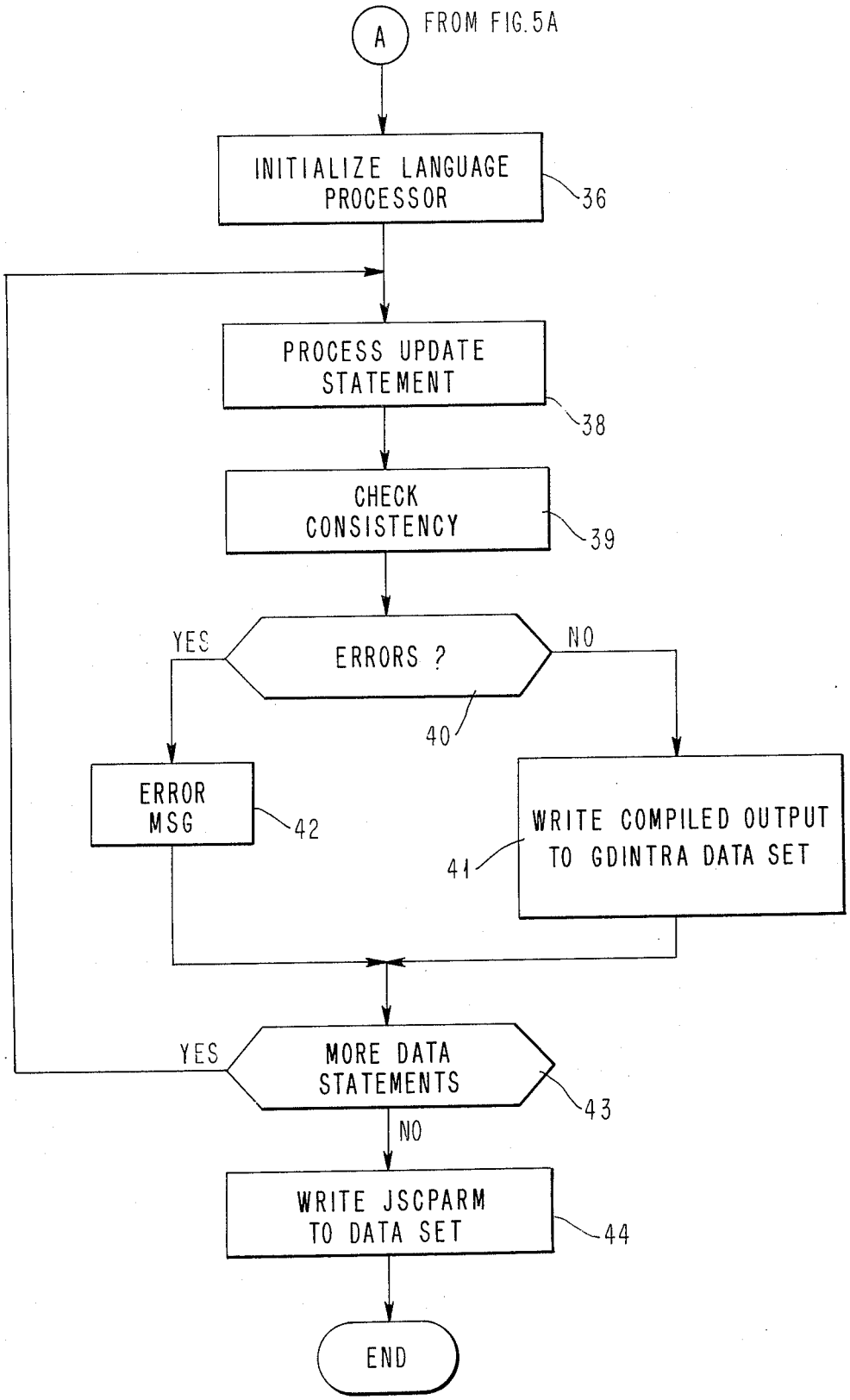
Figure 6:
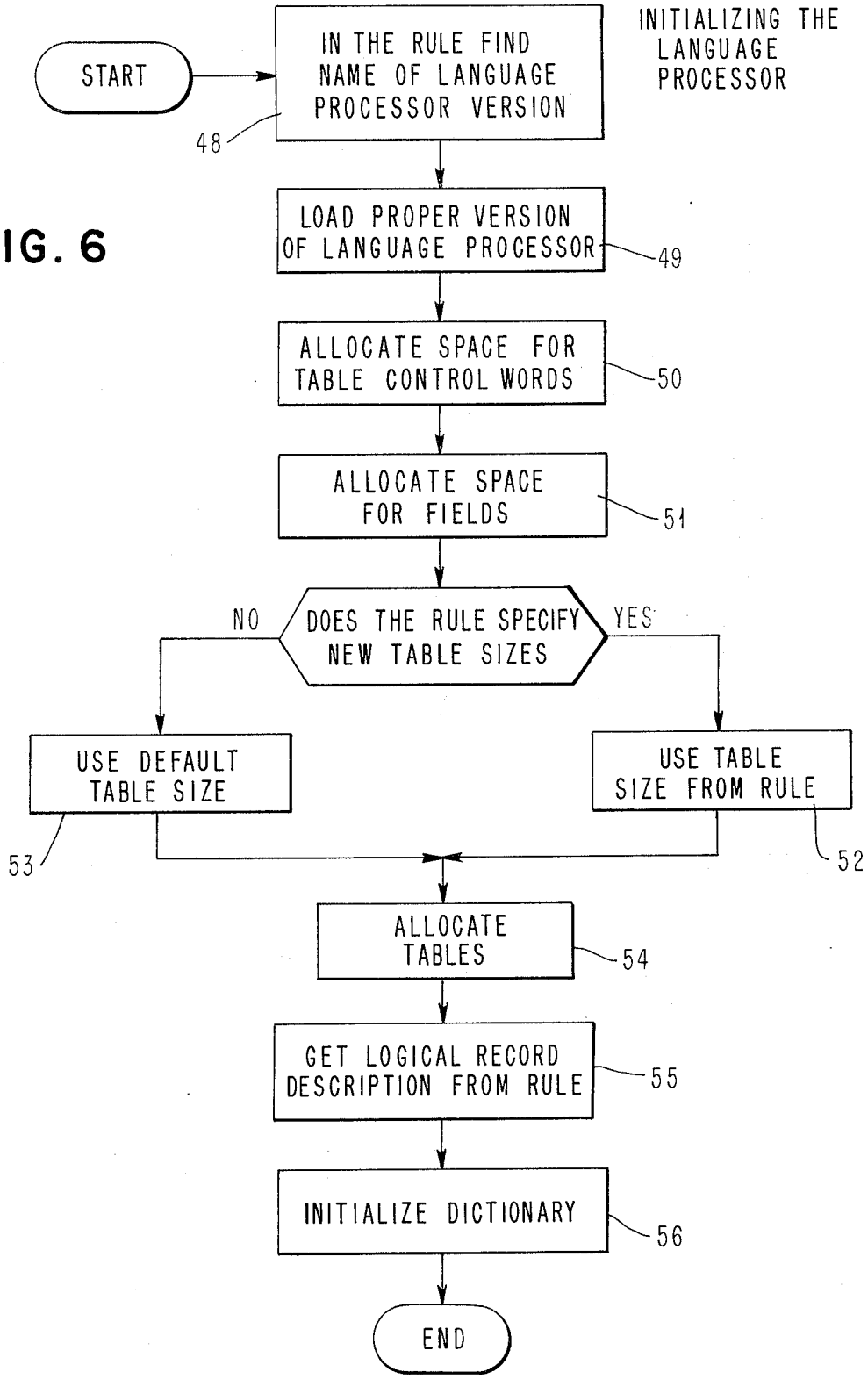
Figure 7A:
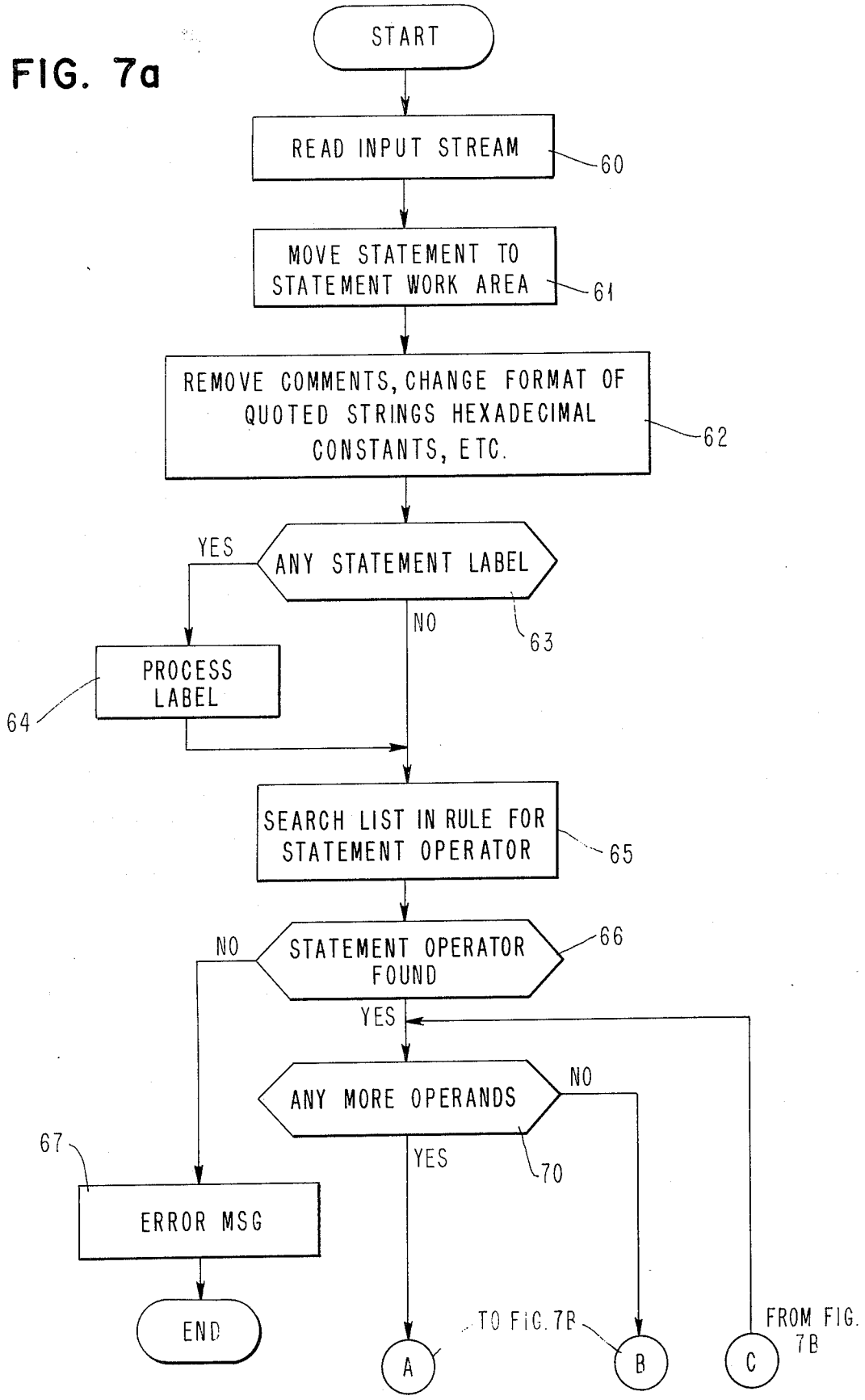
Figure 7B:
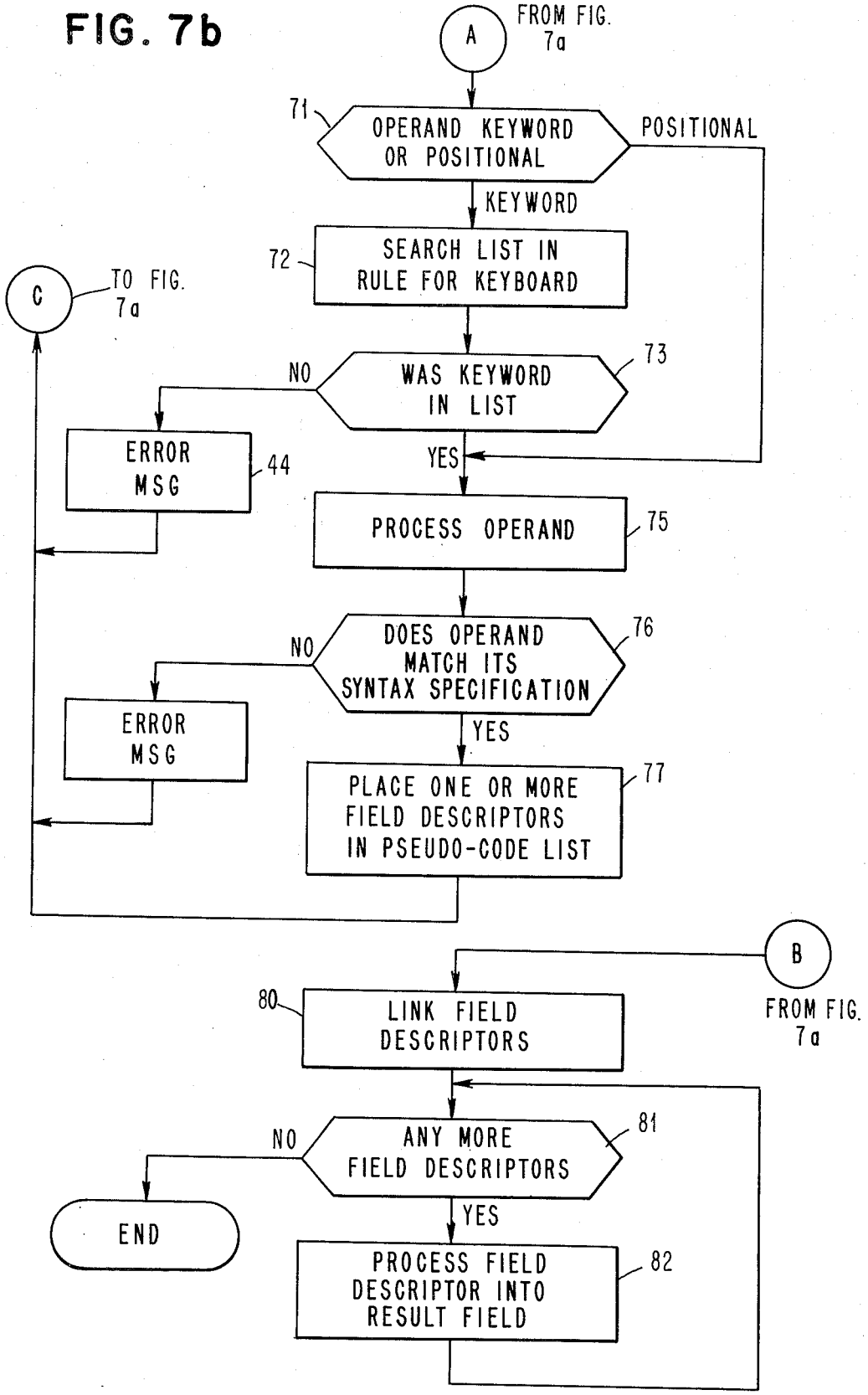
Figure 8:
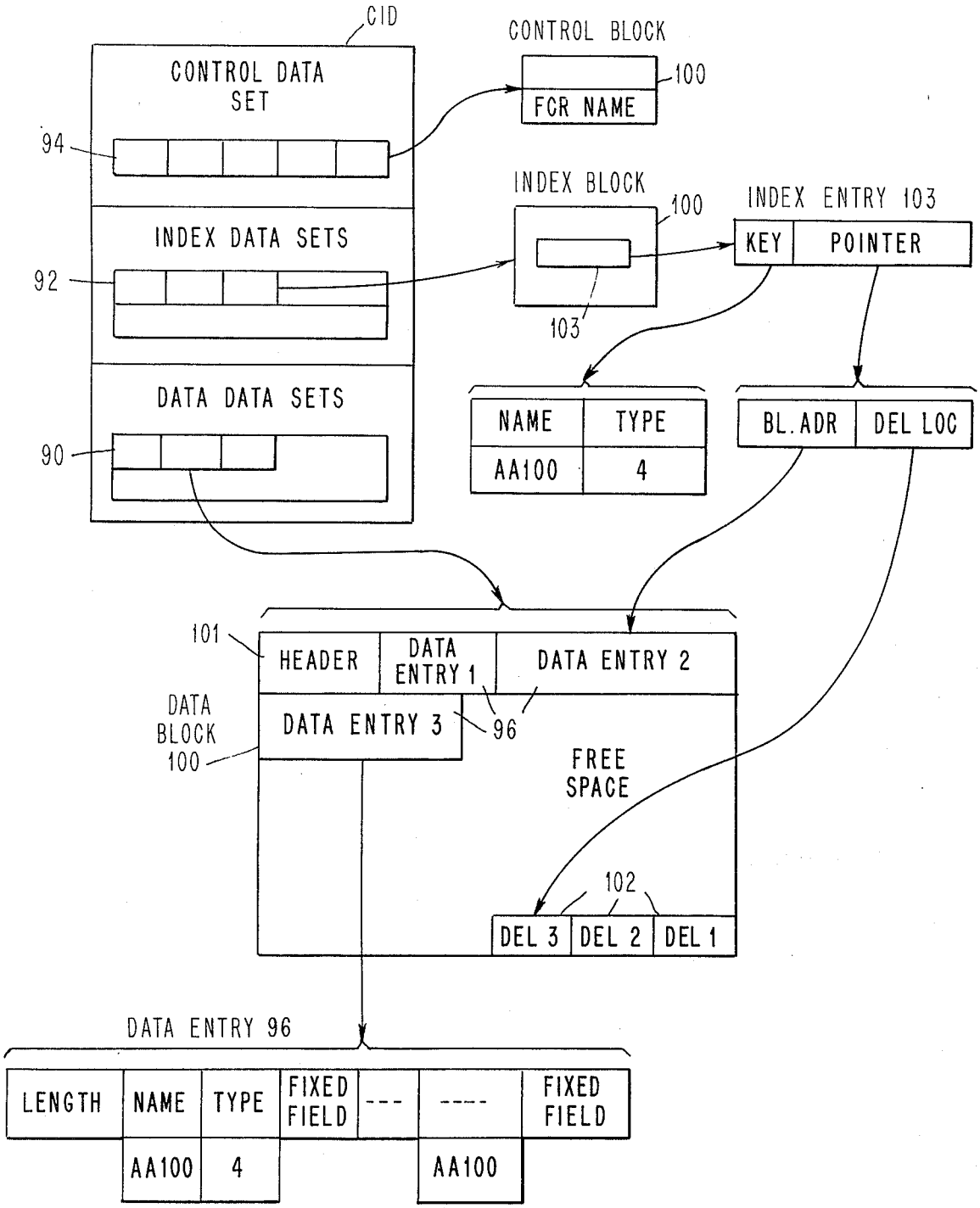
Figure 10:
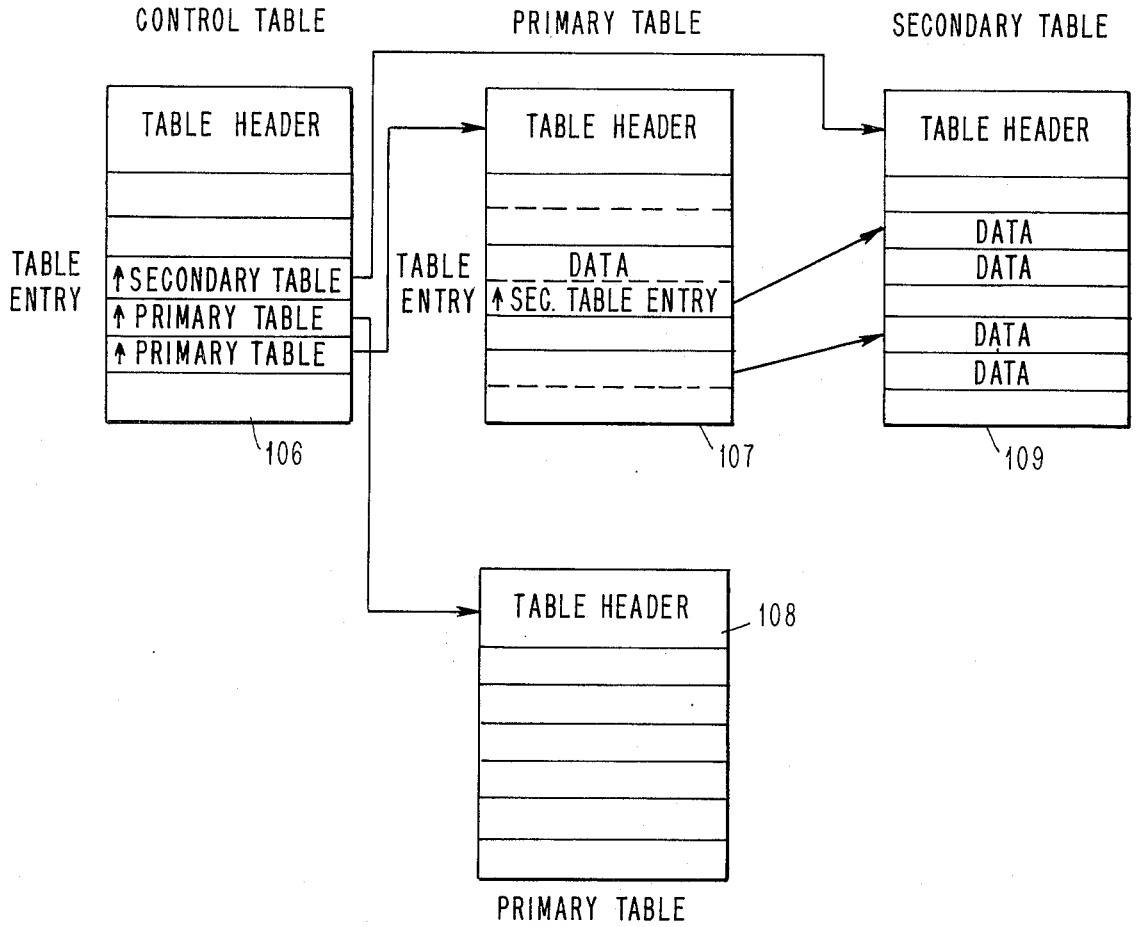
Figure 14:
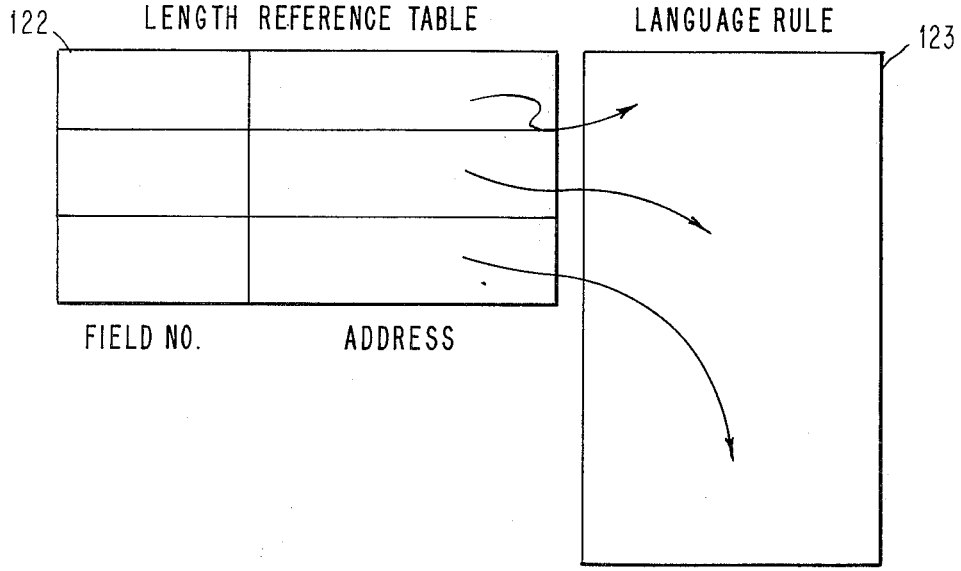
Figure 11:
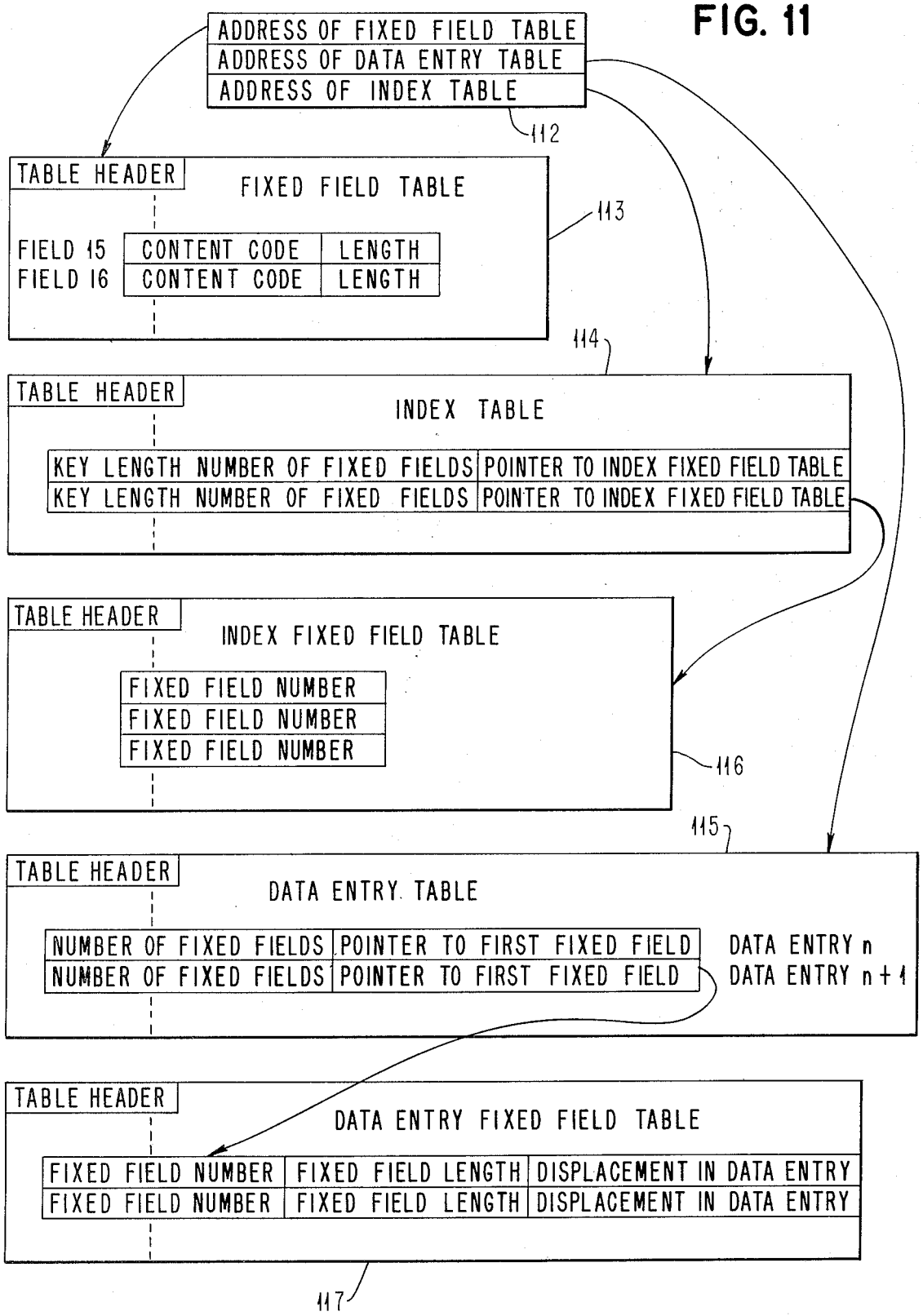
Figure 12:
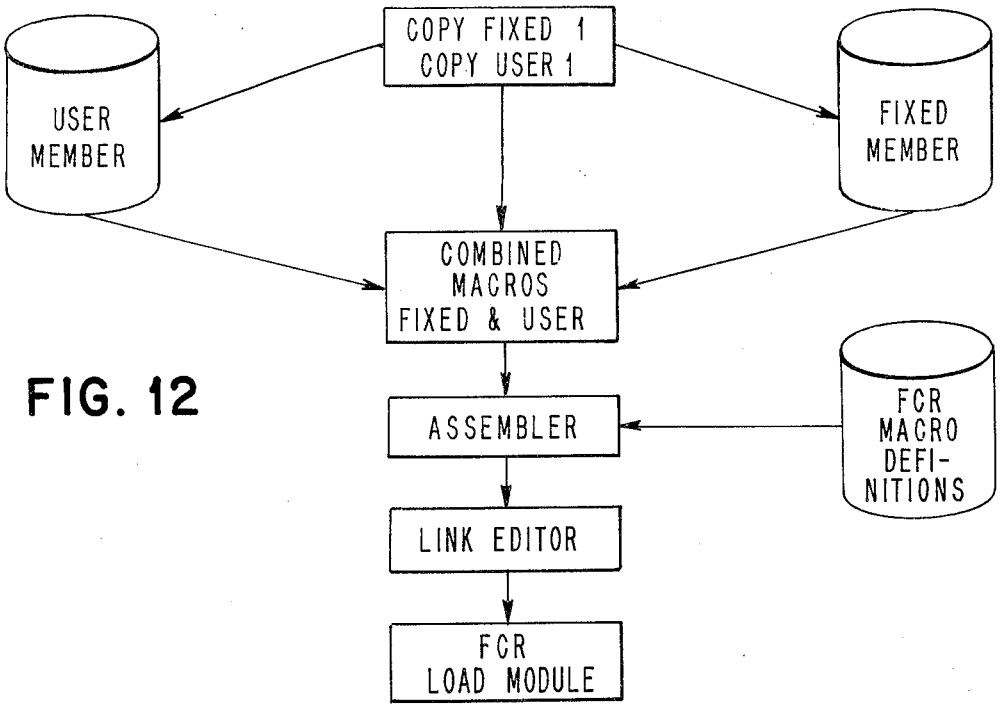
Figure 13:
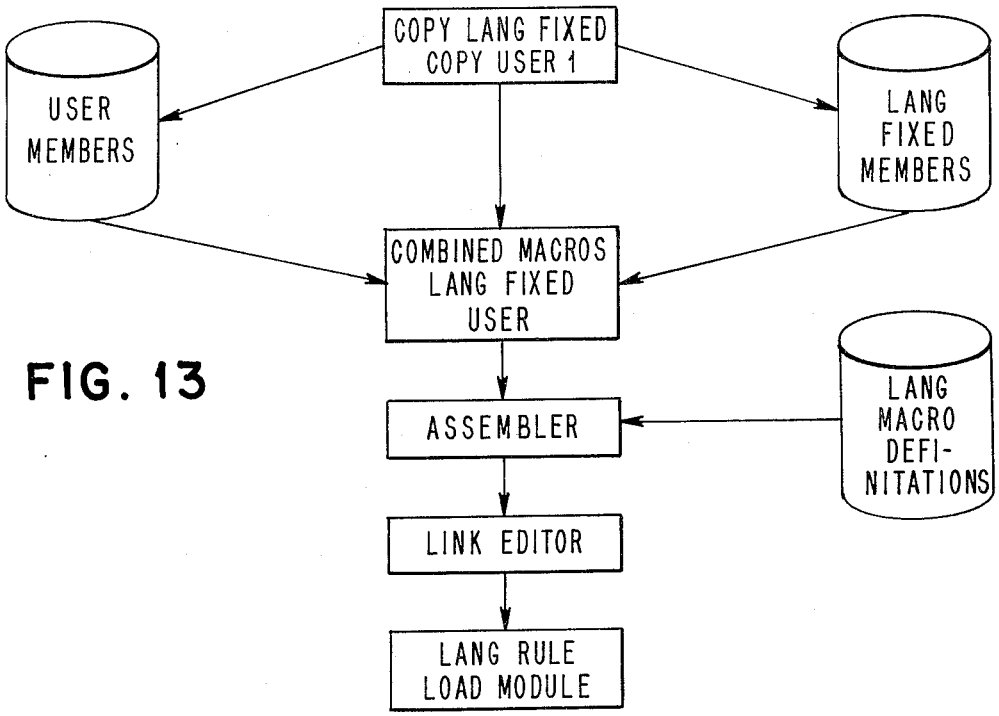
Figure 15:
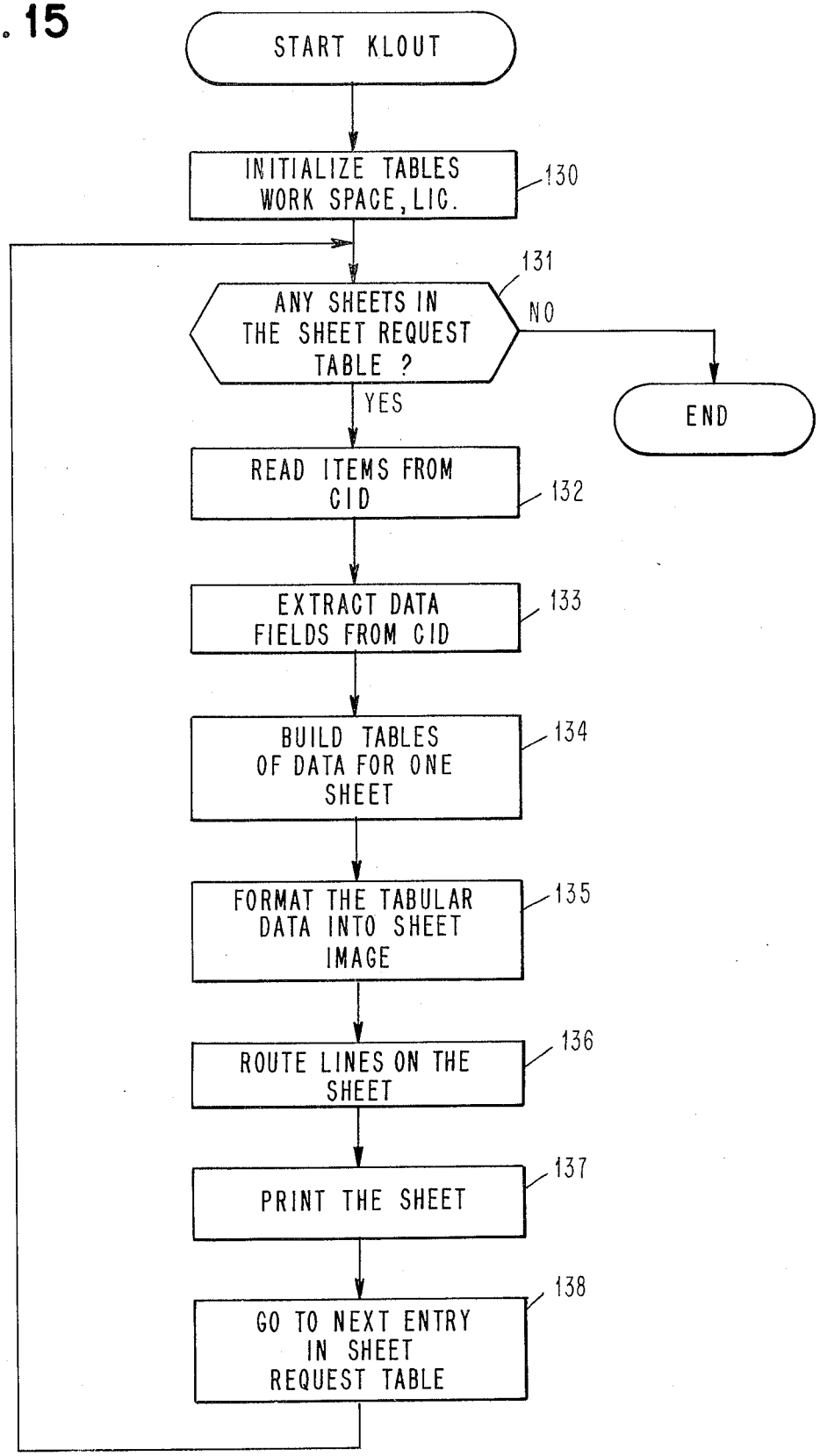
Figure 16:
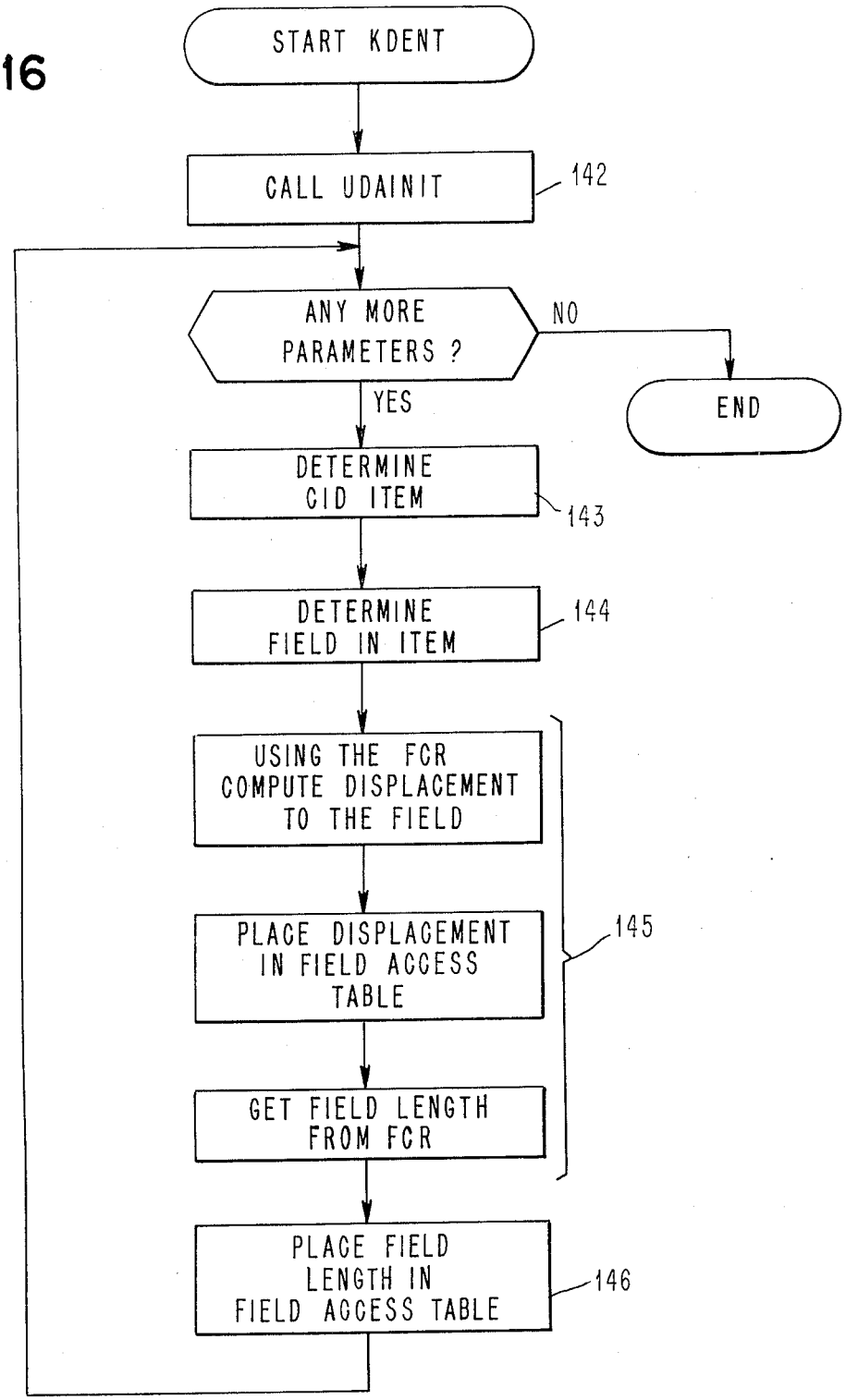
Figure 17:
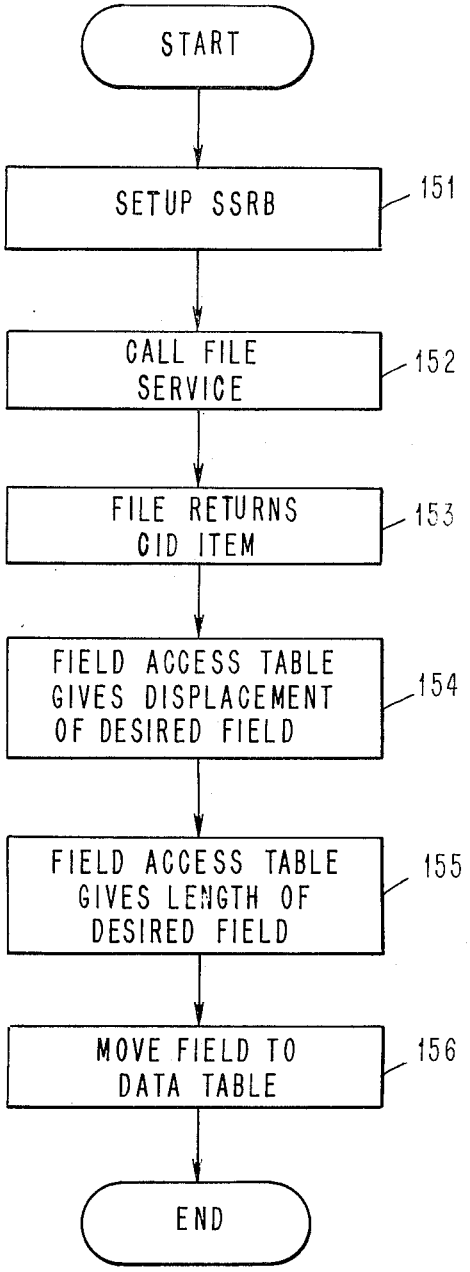
Figure 18:
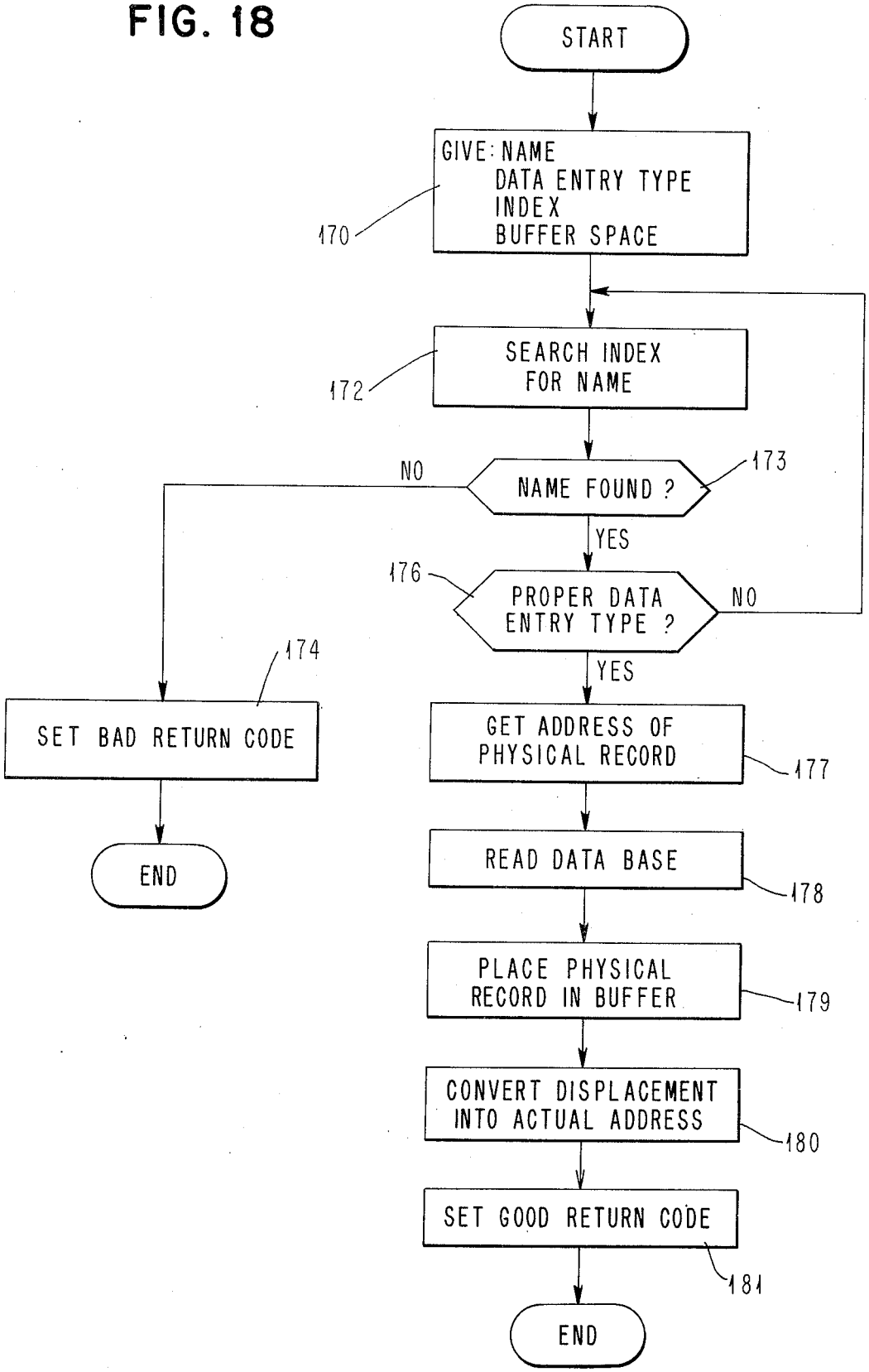
Figure 19:
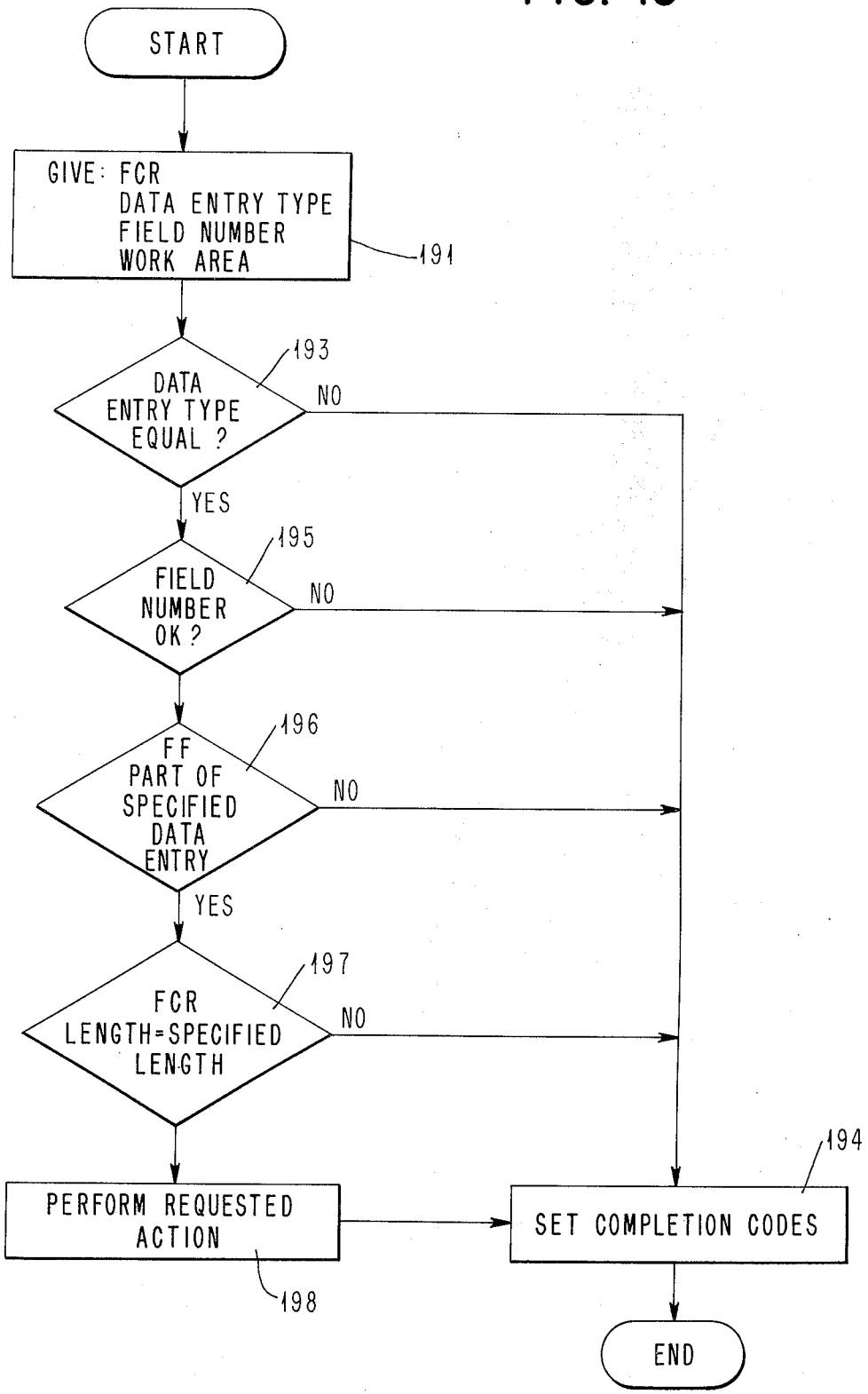

DEFENSIVE PUBLICATION

UNITED STATES PATENT AND TRADEMARK OFFICE

Published at the request of the applicant or owner in accordance with the Notice of Dec. 13, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 8

T940,012

RULES DRIVEN DATA MANAGEMENT PROCESS

Thomas Beretvas, Poughkeepsie, Henry E. Lipman, Croton-on-Hudson, Jere L. Sandorn, Poughkeepsie, and Richard L. Taylor, Wappingers Falls, N.Y., assignors to International Business Machines Corporation, Armonk, N.Y.

Continuation of application Ser. No. 278,312, Aug. 7, 1972. This application June 21, 1974, Ser. No. 481,628
Int. Cl. G06f *15/40, 7/28, 9/06*
U.S. Cl. *444—1*
17 Sheets Drawing. 43 Pages Specification

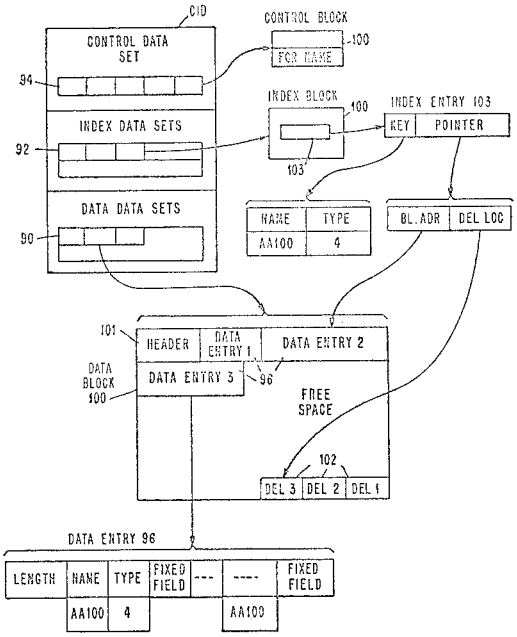

A design automation system has a data base in which data entries are accessed through an index. The characteristics of the data base, such as lengths, syntax, and contents of individual fields, are specified in a master rule. When a processing program accesses the data base, the master rule is also accessed to obtain the field characteristics and to use them to set up any subsidiary rules governing operation of the processing programs. Information is placed in the data base by update commands that identify the fields and contents. A language processor checks the commands and translates them into parameter lists that are used by a file processor to change the data base. Information in the data base can be used by an output processor, e.g., to format and print a logic diagram.

PROCESSING UPDATE STATEMENTS

FIG. 9

GENERAL FORMAT (a)

| | | |
|---|---|---|
| LABEL | OPERATOR | [KEYWORD OPERAND 1 = VALUE 1], [KEYWORD OPERAND 2 = VALUE 2], ···, [KEYWORD OPERAND n = VALUE n] |

START OPERATOR (b)

| | | |
|---|---|---|
| SYMBOLIC RULE NAME | FMCDF | NL = NAME LENGTH |

FIELD DEFINING OPERATOR (c)

| | | |
|---|---|---|
| SYMBOLIC FIELD NAME | FMCFF | NO = FIELD NUMBER<br>L = FIELD LENGTH [, VC = VARIATION CODE]<br>[, CC = CONTENT CODE] |

DATA ENTRY TYPE DEFINING OPERATOR (d)

| | | |
|---|---|---|
| SYMBOLIC DATA ENTRY TYPE | FMCIT | NO = DATA ENTRY TYPE NUMBER<br>[, FF = ( {SYMBOLIC FIELD NAME / FIELD NUMBER} [···]) ] |

INDEX DEFINING OPERATOR (e)

| | | |
|---|---|---|
| SYMBOLIC INDEX NAME | FMCIX | NO = INDEX NUMBER<br>, FF = ( {SYMBOLIC FIELD NAME / FIELD NUMBER} [, ··· ])<br>[, IT = ( {SYMBOLIC DATA ENTRY TYPE / DATA} [···])] |

EXTENDED FIELD DEFINING OPERATOR (f)

| | | |
|---|---|---|
| NAME | UFIELD | NO = FIELD NUMBER<br>L = FIELD LENGTH [, VC = VARIATION CODE]<br>[, SYN = ALLOWABLE SYNTAX] |

ENDING OPERATOR (g)

| |
|---|
| FMCEND |

INITIALIZING THE FIELD ACCESS TABLE